May 2, 1961   M. H. GROVE   2,982,305
VALVE CONSTRUCTION
Filed July 30, 1958   4 Sheets-Sheet 4
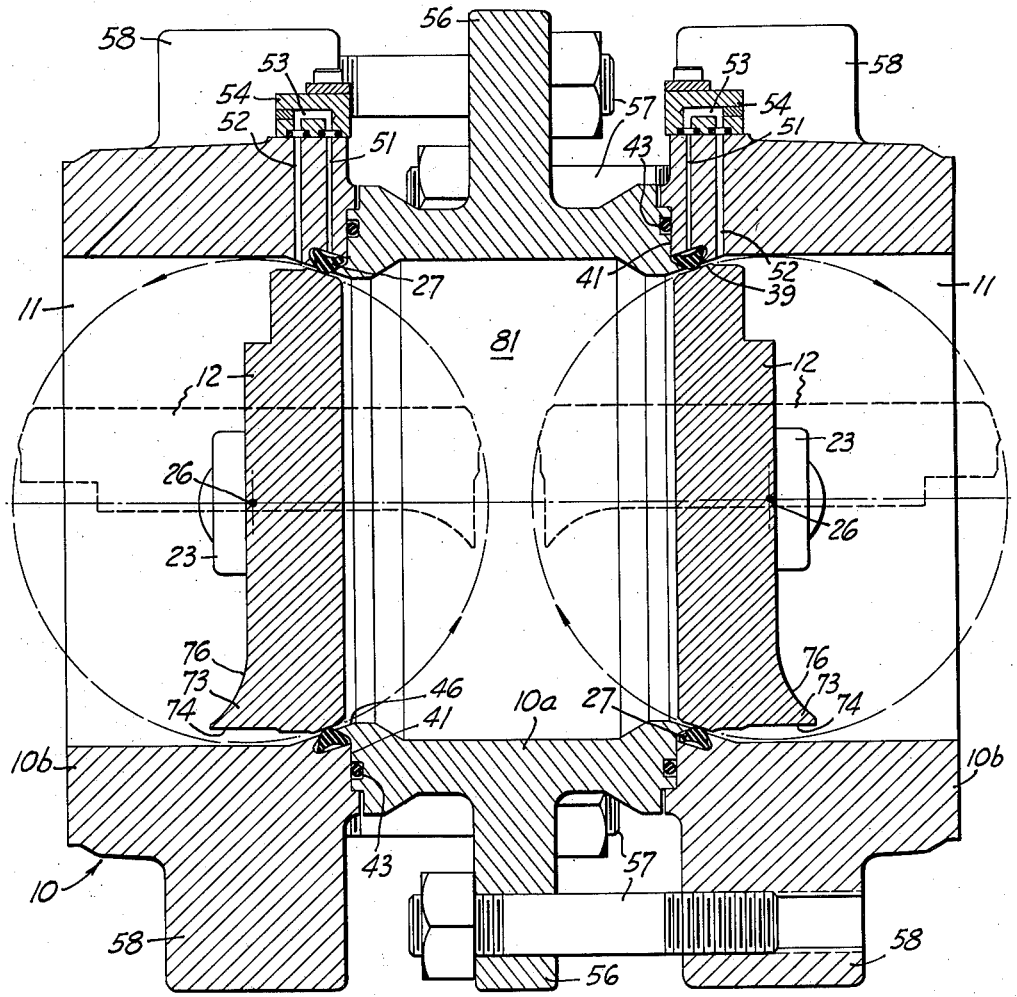
FIG_4_
FIG_5_
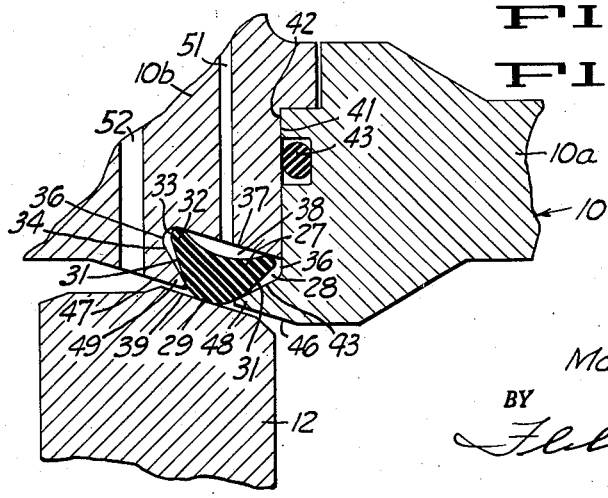
INVENTOR.
Marvin H. Grove
BY
ATTORNEYS

United States Patent Office

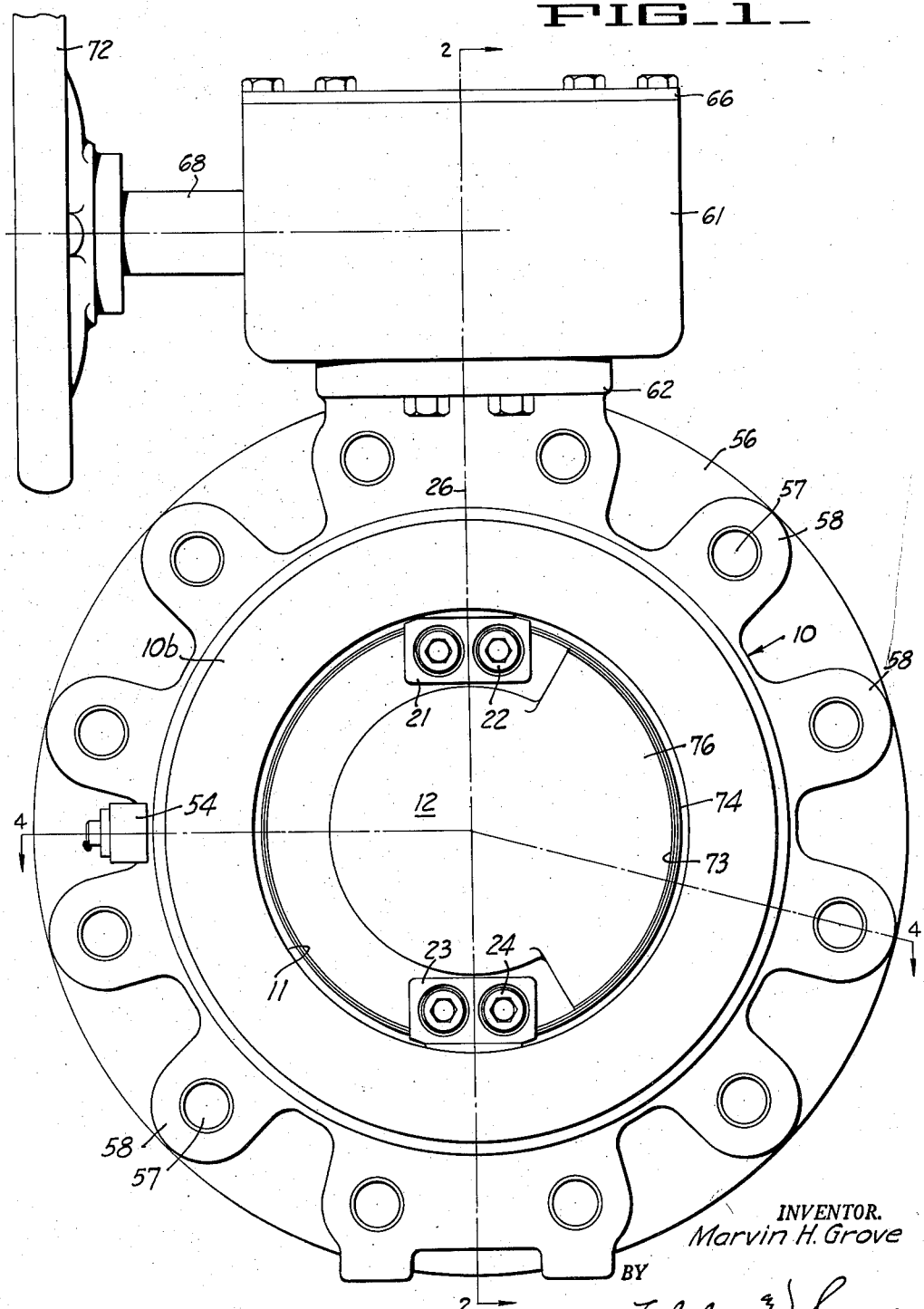
FIG_1_
INVENTOR.
Marvin H. Grove

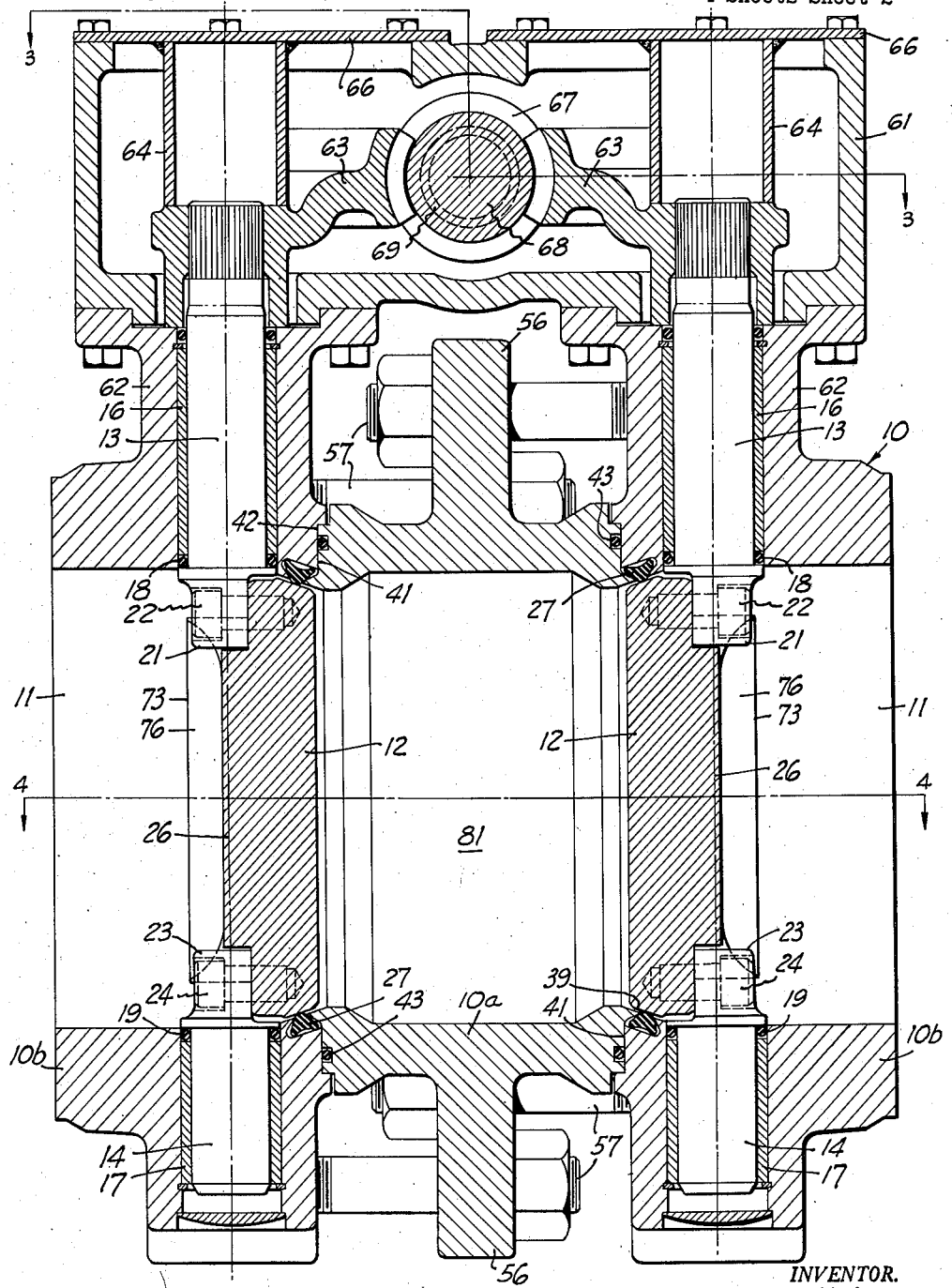
FIG_2_

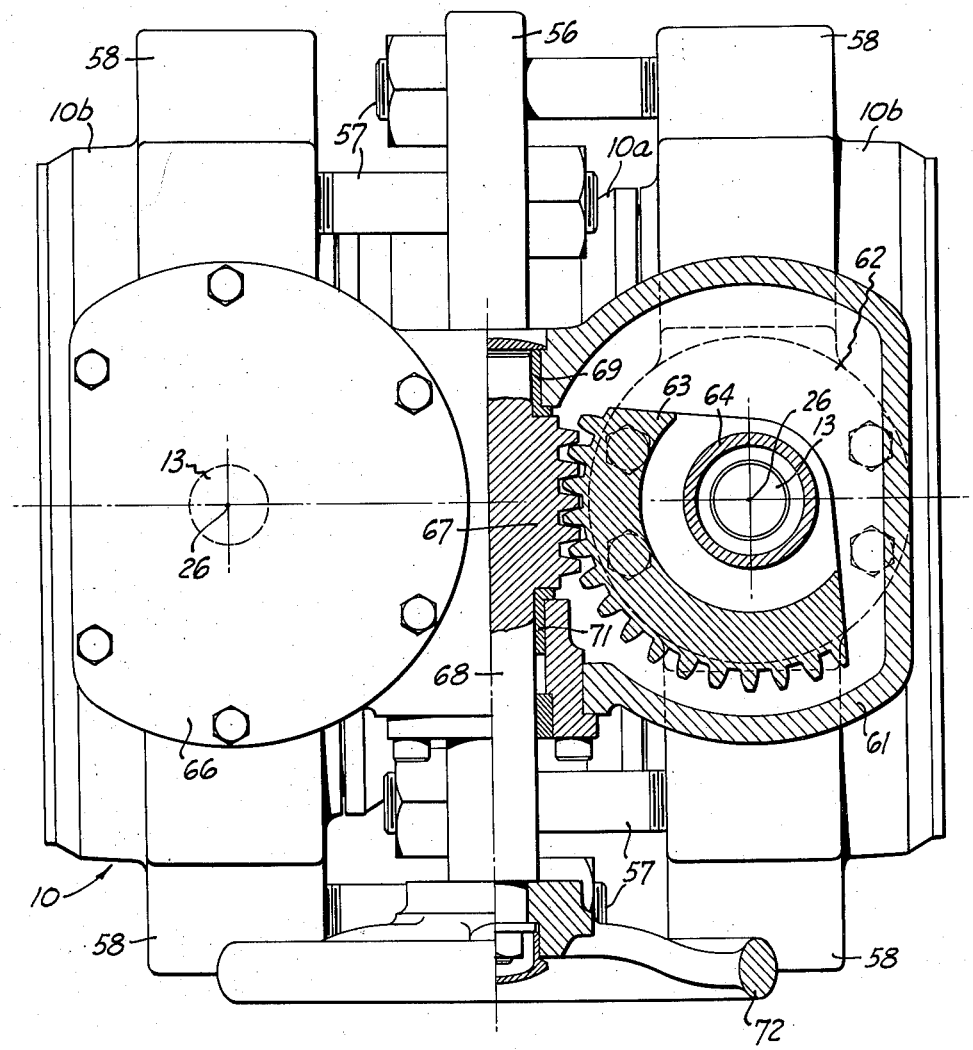

2,982,305
VALVE CONSTRUCTION
Marvin H. Grove, Piedmont, Calif., assignor to Grove Valve and Regulator Company, Oakland, Calif., a corporation of California Filed July 30, 1958, Ser. No. 751,964

1 Claim. (Cl. 137—614.11)

This invention relates generally to valves for controlling flow of various fluids, including liquids and gases, and more particularly pertains to the construction of valves of the so called butterfly type.

Butterfly valves make use of a valve member which is carried by shaft means whereby it can be turned between a closed position at right angles to the flow passage through the valve body, and an open position in which the valve member extends parallel to the axis of the passage. The turning axis of the valve member is either diametrical and parallel to the general plane of the valve member, or at an acute angle to such plane. Conventional butterfly valves use sealing means between the periphery of the valve member and the body, which may in some instances be of the resilient seal ring type.

For many types of services it is desirable to provide two sealing zones with a closed body space therebetween which may be occasionally bled to the atmosphere to indicate leakage. Many valves of the gate type have this desirable characteristic. Because of its use of a single sealing zone, butterfly valves are not applicable to such services.

In general it is an object of the present invention to provide a new type of valve incorporating valve members of the butterfly type, which provides seals in two separate zones that are separate by a closed body space.

Another object of the invention is to provide a novel valve having single operating means for two valve members of the butterfly type.

Another object of the invention is to provide novel sealing means for a valve of the above type, whereby applied pressure differential is held on the upstream one of two sealing zones.

Another object of the invention is to provide a valve having valve members of the butterfly type but which can be used in place of a gate type of valve, having reference particularly to gate valves having sealing zones on both the upstream and downstream sides.

Additional objects and features of the invention will appear from the following description in which the preferred embodiment has been set forth in detail in conjunction with the accompanying drawing.

Referring to the drawing:

Figure 1 is an end view showing a valve in accordance with the present invention.

Figure 2 is a cross-sectional view taken along the line 2—2 of Figure 1.

Figure 3 is a plan view of the valve shown in Figure 1, with certain portions shown in section to illustrate the details of the operating means.

Figure 4 is a cross-sectional view taken along the line 4—4 of Figure 1.

Figure 5 is an enlarged cross-sectional detail illustrating sealing means for one of the butterfly valve members.

The valve construction illustrated in the drawing (Figures 1 and 2) consists of a body 10 having passages 11 for connection with associated piping. The body is shown formed of the middle section 10a, and the duplicate end sections 10b. The valve members 12 may be duplicates as illustrated and are in the form of relatively flat disks. The shafting employed for rotatably mounting each of the valve members 12, includes the aligned shaft sections 13 and 14, which are journaled within the bushings 16, 17. Sealing means 18 and 19 of the O-ring type serve to prevent leakage past the shaft sections 13 and 14. The inner flattened portion 21 of the shaft section 13 is attached to the adjacent portion of the valve member 12, as by screws 22. Similarly the flattened end portion 23 of the shaft section 14 is attached to the valve member by the screws 24. The axis 26 represents the turning axis of each valve member and is the axis of the shaft 13 and 14. It is offset and adjacent to one face of the valve member, as shown particularly in Figures 2 and 4.

As is well known to those familiar with valves of the butterfly type, various types of sealing means can be employed to form an effective fluid tight seal between the periphery of each valve member and the associated body section, for the closed position shown in solid lines in Figures 2 and 4. One type of sealing means which has been used in the past is a resilient seal ring of the O-ring type, which is retained within an accommodating recess formed either in the body or in the periphery of the valve member. The type of resilient sealing means illustrated in Figure 5 is preferred, and is utilized in connection with the present invention in such a manner that a pressure differential holding seal is established for the upstream valve member. Thus the resilient seal ring 27 is provided for each valve member, and is accommodated within a recess 28 formed between the body sections 10a and 10b. In section, seal ring 27 has a generally triangular configuration, with its apex presenting a rounded surface 29, and its side surfaces 31 being disposed at an angle of the order of 60° with respect to each other. The base corners 32 of the seal ring present rounded surfaces 33, and in effect form base legs, which are capable of both bending and compression.

The configuration of the recess 28 is likewise generally triangular, and is defined in section by the side surfaces 34 which are at an angle to each other slightly greater than 60°, as for example about 90°. The rounded or filleted corners 36 of the recess merge the side surfaces with the bottom surface 37. A space 38 is formed at the bottom of the resilient ring, and serves to receive upstream fluid pressure, as will be presently explained.

Each of the valve members 12 has a peripheral valve working surface 39, adapted to contact and seal with respect to the rounded surface 29 of the seal ring. The surface 39 can conform to a truncated cone that is tangent to a sphere having a center coincident with the axis 26, and having an axis coincident with the axis of the fluid passages 11.

The opposed annular faces 41 and 42 formed respectively upon the center body section 10a and one of the adjacent sections 10b, are clamped together. Leakage between the body sections is prevented by suitable sealing means, such as the seal ring 43 of the O-ring type. The parting line between each body section 10b, and the central section 10a, is at one edge of the recess 36, as shown in Figure 5. The peripheral surfaces 46 and 47, formed respectively upon the body sections 10a and 10b, are in opposition to the peripheral surface 39 of the valve member, and are likewise coincident with a truncated cone tangent to the surface of a sphere having its center coincident with the axis 26, and having its axis coincident with the axis of the passages 11. Surfaces 46 and 47 have a fixed clearance with a respect to the surface 39 whereby no metal-to-metal contact occurs between the surface, during normal operation of the valve.

For the relaxed position of each seal ring 27, that is when no differential fluid pressure is being applied, and the corresponding valve member is in closed position, the seal ring is squeezed whereby the apex surface 29 presses into fluid sealing contact with the peripheral surface 39, and whereby the rounded surfaces 33 of the legs 32 are pressed against the surface 37, to form sealing engagements. By virtue of the recess construction described above, lips 48 and 49 are formed which are spaced apart sufficiently far to permit the seal ring to protrude into contact with the peripheral surface 39. In practice the proportioning is such that the lips 48 and 49 exert a certain amount of squeeze against the seal ring 27, in their annular regions of contact.

The space 38 at the base of each seal ring 27 is in communication with the exterior side of its associated valve member. Such communication is established by the body ducts 51 and 52, which are connected by the duct 53, in the exterior block 54.

Suitable means are provided for clamping together the three sections of the body. Thus a flange 56 formed on the middle body section 10a is engaged by the screws 57, which are threaded into ears 58, formed on the body sections 10b.

Suitable means is provided for simultaneously rotating both of the valve members between closed and opened positions. Thus a gear housing 61 is mounted upon the projecting portion 62 of the body sections 10b, and serves to enclose gear sections 63, which are held on to the corresponding ends of the shaft sections 13 by tubular members 64, carried by the gear housing cover 66. Both gear quadrants are engaged by the worm 67, which is carried by operating shafts 68. Bushings 69 and 71 serve to journal the shaft 68, and the exterior end of the shaft is attached to motor or manual operating means such as the hand wheel 72. It will be evident that upon turning the hand wheel 72 and the shaft 68, the two shaft sections 13 are rotated simultaneously in opposite directions.

Preferably, for closed position each valve member is offset inwardly of its turning axis 26, in the manner shown in solid lines in Figures 2 and 4. When turned to full open position, the valve members rotate in opposite directions to the positions shown in dotted lines in Figure 4.

Assuming that the valve is to be used for relatively high operating pressures and flow rates, it is desirable to provide means to prevent excessive torque for positions intermediate full open and closed positions. This means can be in accordance with copending application Serial No. 748,000, filed July 11, 1958. Thus each valve member is provided with a flow deflector 73, which as viewed in Figure 1 is arcuate and conforms to the peripheral curvature of the valve member. The outer peripheral surface 74 conforms generally to the surface of a cylinder, having its axis coincident with the perpendicular center axis of the valve member. The inwardly faced surface 76 is sloped for deflection of fluid flow impinging upon the same.

Without the flow deflectors 73, the valve would be substantially balanced for full opened and closed positions, however, for positions intermediate full open and closed positions, as for example positions where each valve member is at an angle of about 80° from closed position, dynamic forces applied to each valve member would serve to create relatively high torques tending to turn the valve members toward closed position. Depending upon the fluid pressure differentials and flow rates, such torques may be sufficiently high to seriously interfere with operating characteristics of the valve, and necessitating shaft sections of excessive strength.

With the flow deflectors 73 the torque characteristics are radically modified, as disclosed in said copending application Serial No. 748,000. In a typical instance the maximum torque for a butterfly valve member provided with the deflector 73, may be about one-third the maximum torque for the same valve member, without such deflector.

With the present valve construction, wherein the two valve members are moved simultaneously between full open and closed positions, the deflectors 73 function to reduce the torque requirements substantially the same as described in said copending application. This reduction in torque takes place irrespective of the direction of flow.

Operation of the valve described above is as follows: For the closed position illustrated in solid lines in Figures 2 and 4, and assuming that no pressure differential is being applied, both of the seal rings 27 establish initial seals between the body and their corresponding valve members. When a fluid pressure differential is applied to say the left hand passage of the valve as shown in Figure 4, such upstream pressure is transmitted through the ducts 52, 53, and 51, whereby it is applied to the base surface of the seal ring, thus tending to urge the seal ring against the peripheral surface 39 of the valve member. Assuming that the pressure upon the downstream side is atmospheric, then the corresponding downstream seal ring 27 is relatively relaxed, and the pressure in the space 81 between the valve members 12, may likewise be near atmospheric or of a value not greater than will vent past the downstream seal ring. An operator may connect the space 81 to the atmosphere through a small bleed valve, to make certain that the valve is not leaking. Assuming now that the operator desires to move the valve to open position, the hand wheel 72 is turned whereby both valve members are turned in opposite directions about the axis 26 to the full open positions shown in dotted lines in Figure 4. During such turning movement the torques developed tending to rotate the valve members, are not excessive, because of the action of the deflectors 73. Assuming return of the valve to closed position, seals are again established between the body and the seal rings, with the fluid pressure differential being held mainly by the upstream seal.

If application of fluid should be reversed, whereby the right hand side of the valve becomes the upstream side, the operation is the same, except that the right hand seal now holds the pressure differential, with the pressure in the space 81 being at or near the downstream pressure.

The downstream seal ring tends to be self-relieving with respect to excessive body pressure. In other words the downstream seal ring, because upstream fluid pressure is not being applied to its base space 28, does not form an effective seal tending to hold a high differential fluid pressure applied between the space 81 and the downstream passage 11. However, the seal on the downstream side may hold a pressure differential well below the pressure differentials for which the valve is designed. Thus when space 81 is filled with liquid and the valve closed, excessive pressure cannot build up in the body, due for example to temperature increases.

I claim:

In a valve for controlling flow of fluids, a valve body having aligned flow passages for connection with associated piping, a pair of butterfly valve members within the body, a pair of spaced parallel shafts serving to mount the valve members for turning movement about the axes of said shafts between closed positions in which the valve members extend substantially at right angles to the axis of the body to full open positions in which they extend substantially intermediate of the passages and parallel to the axis of the same, the axis of turning movement for each valve member being generally diametrical to the plane of the same, there being a closed space between the valve members for closed position of the same, resilient sealing means carried by the body and spaced longitudinally of the body axis, and sealing means forming fluid tight seals between the periphery of each valve member and the body for closed position of the valve member, and means for urging each sealing means individually into sealing engagement with the associated valve member by application of fluid pressure, said means for urging the sealing means including duct means forming separate pressure transmitting communications between each of the said sealing means and the associated valve passage whereby fluid pressure applied to either one of the two valve passages serves to urge the resilient sealing means for the corresponding upstream valve member against the peripheral surface of the same, and means for simultaneously turning both said valve members between closed and open positions.

References Cited in the file of this patent

UNITED STATES PATENTS

| | | |
|---|---|---|
| 2,081,842 | Sharp | May 25, 1937 |
| 2,095,263 | Moss | Oct. 12, 1937 |
| 2,271,390 | Dodson | Jan. 27, 1942 |
| 2,389,194 | Hamer | Nov. 20, 1945 |
| 2,673,708 | Danks | Mar. 30, 1954 |